(12) United States Patent
Stufflebeam

(10) Patent No.: US 11,384,262 B2
(45) Date of Patent: Jul. 12, 2022

(54) PACKAGING MATERIAL WITH MATTE AND GLOSSY APPEARANCE, AND COLD SEAL ADHESIVE

(71) Applicant: Printpack Illinois, Inc., Elgin, IL (US)

(72) Inventor: Jason Stufflebeam, Marietta, GA (US)

(73) Assignee: Printpack Illinois, Inc., Elgin, IL (US)

( * ) Notice: Subject to any disclaimer, the term of this patent is extended or adjusted under 35 U.S.C. 154(b) by 77 days.

(21) Appl. No.: 16/648,734

(22) PCT Filed: Nov. 29, 2017

(86) PCT No.: PCT/US2017/063643
§ 371 (c)(1),
(2) Date: Mar. 19, 2020

(87) PCT Pub. No.: WO2019/067005
PCT Pub. Date: Apr. 4, 2019

(65) Prior Publication Data
US 2020/0248038 A1    Aug. 6, 2020

Related U.S. Application Data

(60) Provisional application No. 62/565,294, filed on Sep. 29, 2017.

(51) Int. Cl.
C09J 7/40      (2018.01)
C09J 7/29      (2018.01)
C09J 7/22      (2018.01)

(52) U.S. Cl.
CPC ............. *C09J 7/403* (2018.01); *C09J 7/22* (2018.01); *C09J 7/29* (2018.01); *C09J 7/401* (2018.01);
(Continued)

(58) Field of Classification Search
CPC ....... C09J 7/403; C09J 7/22; C09J 7/29; C09J 7/401; C09J 2477/005; Y10T 428/1476;
(Continued)

(56) References Cited

U.S. PATENT DOCUMENTS 4,873,311 A    10/1989 Bornack, Jr. et al.
5,466,734 A    11/1995 Catena et al.
(Continued)

FOREIGN PATENT DOCUMENTS

EP    0326648 A2    8/1989
EP    2266892 A1    12/2010
(Continued)

OTHER PUBLICATIONS

International Search Report in counterpart International Application No. PCT/US2017/063643 dated Apr. 30, 2018, pp. 1-3.
(Continued)

*Primary Examiner* — Patricia L. Nordmeyer
(74) *Attorney, Agent, or Firm* — Additon, Pendleton & Witherspoon, P.A.

(57) ABSTRACT

A packaging material can include cold seal adhesive on a first side of a substrate, glossy material on a second side of the substrate, and matte material on the glossy material, so that the matte material covers at least a predetermined portion of the glossy material. Each of the glossy and matte materials can be a cold seal release lacquer configured so that when the packaging material is formed into a roll, the cold seal adhesive is releasably adhered to the cold seal release lacquers, the glossy cold seal release lacquer is fixedly adhered to the substrate, and the matte cold seal release lacquer is fixedly cohered to the glossy cold seal release lacquer.

29 Claims, 4 Drawing Sheets

(52) U.S. Cl.
CPC .... *C09J 2477/005* (2013.01); *Y10T 428/1476* (2015.01)

(58) Field of Classification Search
CPC ... B32B 2255/10; B32B 2255/12; B32B 7/12; B32B 27/08; B32B 2250/02; B32B 27/10; B32B 27/16; B32B 27/32; B32B 2255/20; B32B 2255/26; B32B 2255/28; B32B 2307/31; B32B 2307/4023; B32B 2307/412; B32B 2307/518; B32B 2439/46; B32B 27/36; B32B 2439/62; B32B 2439/70; B32B 2307/406; B32B 2307/408
See application file for complete search history.

(56) References Cited

U.S. PATENT DOCUMENTS

| | | | | |
|---|---|---|---|---|
| 5,981,047 | A | * | 11/1999 | Wilkie .................... C08L 23/04 428/355 R |
| 6,287,658 | B1 | * | 9/2001 | Cosentino ................ C09J 7/38 428/41.5 |
| 7,278,205 | B2 | | 10/2007 | Huffer et al. |
| 2005/0003155 | A1 | | 1/2005 | Huffer |
| 2012/0152785 | A1 | | 6/2012 | Benson et al. |
| 2016/0319074 | A1 | | 11/2016 | Boccon et al. |

FOREIGN PATENT DOCUMENTS

| | | |
|---|---|---|
| JP | 2009-262336 A | 11/2009 |
| WO | 2019/067005 A1 | 4/2019 |

OTHER PUBLICATIONS

Written Opinion of the International Searching Authority in counterpart International Application No. PCT/US2017/063643 dated Apr. 4, 2019, pp. 1-7.

International Preliminary Report on Patentability in counterpart International Application No. PCT/US2017/063643 dated Mar. 31, 2020, pp. 1-8.

* cited by examiner

PACKAGING MATERIAL WITH MATTE AND GLOSSY APPEARANCE, AND COLD SEAL ADHESIVE

CROSS-REFERENCE TO PRIORITY APPLICATION

This application hereby claims the benefit of U.S. Provisional Patent Application No. 62/565,294 filed Sep. 29, 2017, and entitled Packaging Material with Matte and Glossy Appearance, and Cold Seal Adhesive, which is hereby incorporated by reference in its entirety.

BACKGROUND

The present invention generally relates to packaging material that includes a cold seal adhesive and an anti-blocking/release agent.

The use of cold seal technology to form packages is well known. Cold sealing involves the use of a cold seal adhesive (e.g., a pressure-sensitive adhesive), typically coated onto a portion of a polymer film-based structure. Sealing can be effected by means of pressure without the use of heat (e.g., at ambient temperature).

As will be appreciated by those of ordinary skill in the art, when a packaging material including a cold seal adhesive is wound into a roll, blocking (e.g., too much adhesion) may occur between the cold seal adhesive located at one side (e.g., a first side or surface) of the packaging material, and the opposite (e.g., second side or surface) of the packaging material. Accordingly, it is typical for the polymer film base layer to include an anti-blocking/release agent. This may be an internal treatment that migrates to the surface of the film, or an external coating applied to the film, to form a "release film". In either case, a packaging material that includes such a release film can typically be successfully wound into a roll without the cold seal adhesive fixedly adhering to the release film.

Unfortunately, when the packaging material is intended to be printed, certain finishes tend not to adhere to the release film. For example, for some packaging applications, it may be desirable to have some of the printed artwork have a glossy appearance, and some other of the artwork to have a matte appearance. In the case of cold seal packaging materials, since the base film typically has an inherently glossy appearance, this could seemingly be achieved by simply printing a matte finish on the release film, leaving uncoated areas or windows that are desirably glossy. However, since the matte coating tends not to adhere to the release film, a packaging material including matte and glossy areas has typically needed to be formed by using a non-release film, and separately printing matte and glossy release coatings in the desired, respective areas on the film. The registration of (e.g., close placement of adjacent edges of) the two different coatings can be challenging, particularly with complex artwork, which typically leads to suboptimal results. Accordingly, there is a desire for a packaging material that provides a new balance of properties.

SUMMARY

An aspect of this disclosure is the provision of packaging material comprising cold seal adhesive on a first side of a substrate, glossy material on a second side of the substrate, and matte material on the glossy material, so that the matte material covers at least predetermined portion(s) of the glossy material. In an exemplary embodiment, each of the glossy and matte materials can be a cold seal release lacquer ("CSRL") configured so that when the packaging material is formed into a roll, the cold seal adhesive is releasably adhered to one or both of the CSRLs, the glossy CSRL is fixedly adhered to the substrate, and the matte CSRL is fixedly adhered and/or cohered to the glossy CSRL. The glossy CSRL typically has a shinier visual appearance than the matte CSRL.

In an aspect of this disclosure, a packaging material comprises: a substrate having opposite first and second sides; cold seal adhesive on the second side of the substrate; glossy CSRL on the first side of the substrate; and matte CSRL fixedly connected to at least a predetermined surface area of the glossy CSRL. For example, the matte CSRL can cover the predetermined surface area of the glossy CSRL, so that the predetermined surface area of the glossy CSRL is positioned between the matte CSRL and the first side of the substrate. The predetermined surface area of the glossy CSRL can be a first predetermined surface area of the glossy CSRL, and a second predetermined surface area of the glossy CSRL may not be covered by the matte CSRL. The matte CSRL can form a first portion of an exterior surface of the packaging material, and the second predetermined surface area of the glossy CSRL can form a second portion of the exterior surface of the packaging material.

As another example, a packaging material can comprise: a substrate having opposite first and second sides, wherein the substrate comprises ink on a polymeric film, the polymeric film forms the first side of the substrate, and the polymeric film is transparent, translucent or any combination thereof; cold seal adhesive on the second side of the substrate; glossy CSRL on the first side of the substrate, wherein the glossy CSRL is transparent, translucent or any combination thereof; and matte CSRL in opposing, face-to-face, direct contact with, and fixedly connected to, a first predetermined surface area of the glossy CSRL. The matte CSRL can cover the first predetermined surface area of the glossy CSRL. The first predetermined surface area of the glossy CSRL can be positioned between the matte CSRL and the first side of the substrate. The matte CSRL can form a first portion of an exterior surface of the packaging material. A second predetermined surface area of the glossy CSRL may not be covered by the matte CSRL. The second predetermined surface area of the glossy CSRL can form a second portion of the exterior surface of the packaging material. The first and second portions of the exterior surface of the packaging material can be contiguous with one another.

As an additional example, a method of at least partially forming packaging material can comprise: applying, in at least one coat, glossy CSRL, so that the applied glossy CSRL is on a side of a substrate; and applying, in at least one coat, matte CSRL directly onto at least a first predetermined surface area of the applied glossy CSRL, wherein the applied matte CSRL forms a first portion of an exterior surface of the packaging material, and a second predetermined surface area of the glossy CSRL forms a second portion of the exterior surface of the packaging material. In a further example, the first predetermined surface area of the applied glossy CSRL is not deglossed prior to the applying of the matte CSRL. The applying of the glossy CSRL can be comprised of flood coating the glossy CSRL on the side of the substrate. The applying of the matte CSRL can be comprised of spot coating the matte CSRL directly onto the glossy CSRL. A pattern of cold seal adhesive can be applied on a second side of the substrate. The packaging material can be formed into a roll so that the cold seal adhesive is in opposing, face-to-face contact with at least one of the glossy CSRL and the matte CSRL. The packaging material can be unrolled so that the cold seal adhesive releases from both the glossy CSRL and the matte CSRL, without the matte CSRL releasing from the glossy CSRL.

The foregoing summary provides a few brief examples and is not exhaustive, and the present invention is not limited to the foregoing examples. The foregoing examples, as well as other examples, are further explained in the following detailed description with reference to accompanying drawings.

BRIEF DESCRIPTION OF THE DRAWINGS

The drawings discussed below are schematic, and features depicted therein are not drawn to scale. The drawings are provided as examples. The present invention may, however, be embodied in many different forms and should not be construed as limited to the examples depicted in the drawings.

DETAILED DESCRIPTION

Examples of embodiments are disclosed in the following. The present invention may, however, be embodied in many different forms and should not be construed as limited to the embodiments set forth herein. For example, features disclosed as part of one embodiment can be used in the context of another embodiment to yield a further embodiment.

Figure 1:
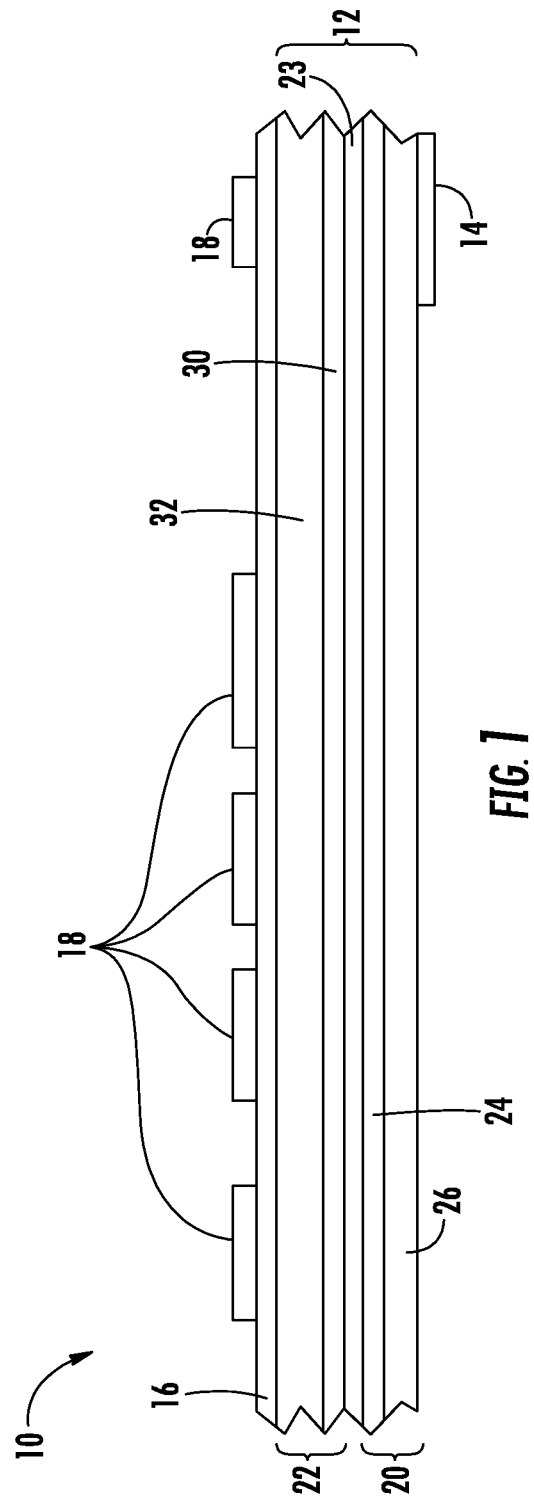
FIG. 1 is a schematic cross-sectional view of packaging material in a flat configuration, wherein the cross-section is taken perpendicular to the length of the packaging material, in accordance with a first embodiment of this disclosure.

In a first embodiment depicted in FIG. 1, a packaging material 10 includes a substrate 12, a pattern of cold seal adhesive 14 (e.g., cold-sealing coating) on one side (e.g., a first side or surface) of the substrate, a glossy material 16 on the opposite (e.g., second side or surface) of the substrate, and matte material 18 on the glossy material 16. The glossy material 16 can be at least one flood coat of glossy cold seal release lacquer ("CSRL") 16, and the matte material 18 can be configured as a pattern (e.g., at least one spot coating) of matte CSRL 18. The glossy CSRL 16 can cover all of, or at least the vast majority of (e.g., can cover substantially all of) the second side or surface of the substrate 12. In the example depicted in FIG. 1, the matte CSRL 18 is in opposing, face-to-face, direct contact with the glossy CSRL 16, although it is believed that, perhaps in alternative embodiments, there may be one or more intervening layers. Each of the at least two CSRLs 16, 18 can be provided in the form of one or more coatings.

In the first embodiment, the cold seal adhesive 14 and the CSRLs 16, 18 are cooperatively configured so that the packaging material 10 can be successfully wound into a roll in which the cold seal adhesive 14 is in opposing, face-to-face, direct contact with, and releasably adhered to, at least one of (e.g., each of) the CSRLs 16, 18, without the cold seal adhesive fixedly adhering to the CSRLs. As a result, the packaging material 10 can be readily unwound from the roll and formed into packages (e.g., bags, overwraps, boxes and/or other suitable containers). Surprisingly and advantageously, the matte CSRL 18 remains fixedly connected to (e.g., fixedly cohered and/or adhered to) the glossy CSRL 16 when the packaging material 10 is unwound from the roll and formed into packages. It is surprising that the matte CSRL 18 remains fixedly connected to the glossy CSRL 16 because, for example, it is believed that one of ordinary skill would have thought that the matte CSRL would readily peel off of the glossy CSRL, for example during the unwinding of the packaging material 10 from its roll.

In the embodiment depicted in FIG. 1, the substrate 12 can be a laminate formed by joining at least a first web 20 and a second web 22 to one another. The substrate 12 can further include adhesive material 23 positioned between, and fixedly joining together, the first and second webs 20, 22, as will be discussed in greater detail below.

The first web 20 can be a metallized film 20. The metalized film 20 can comprise, consist essentially of, or consist of a metallic layer 24 (e.g., aluminum oxide) on an interior polymeric film 26. As one example, the interior polymeric film 26 can be a polypropylene film, for example biaxially oriented polypropylene film ("BOPP"). As other examples, the interior polymeric film 26 can comprise polyester or any other suitable material. The interior polymeric film 26 can be replaced with one or more other suitable materials, for example paper or any other suitable layer. Optionally, the metallic layer 24 can be omitted. Similarly, one or more other layers of the packaging material 10 may be omitted or otherwise varied.

The second web 22 can comprise, consist essentially of, or consist of at least one ink coating 30 on an outer polymeric film 32. The outer polymeric film 32 can be a glossy (e.g., transparent) polypropylene film, for example BOPP. As another example, the outer polymeric film 32 can be replaced with, or otherwise comprise, polyester or any other suitable material. One or both of the opposite sides of the outer polymeric film 32 can be treated, for example conventionally corona treated and/or conventionally chemically treated.

The ink(s) 30 can define artwork that is visible through the outer polymeric film 32 and the at least two CSRLs 16, 18, as discussed in greater detail below. Regarding such artwork in embodiments in which the packaging material 10 is formed into packages (e.g., bags, overwraps, boxes and/or other suitable containers), the artwork can be visible on the exterior of the packages, wherein the CSRLs 16, 18 at least partially form the exterior of the packages. The packages can contain articles, for example food products or any other suitable articles. Each package can include one or more conventional seals (e.g., one or more end seals and/or fin seals) that are formed by, or at least partially formed by, the cold seal adhesive 14, as discussed in greater detail below.

Each of the CSRLs 16, 18 can be transparent, translucent or any combination thereof. The glossy CSRL 16 can be optically transparent, or at least more optically transparent than the matte CSRL 18. The glossy CSRL 16 can reflect light less diffusely than the matte CSRL 18. The glossy CSRL 16 can have a shinier visual appearance than the matte CSRL 18.

The matte CSRL 18 can cover a first predetermined surface area of the glossy CSRL 16. As a result, the first predetermined surface area of the glossy CSRL 16 can be positioned between the matte CSRL 18 and the first side of the substrate 12, the matte CSRL typically is not in direct contact with the substrate, and a second predetermined surface area of the glossy CSRL typically is not covered by the matte CSRL. The matte CSRL 18 can form a first portion of an exterior surface of the packaging material 10, and the second predetermined surface area of the glossy CSRL 16 can form a second portion of the exterior surface of the packaging material, wherein these first and second portions of the exterior surface of the packaging material can be adjacent, or more specifically contiguous with, one another. In accordance with the first embodiment, neither the first predetermined surface area of the glossy CSRL 16, nor the second predetermined surface area of the glossy CSRL 16, is deglossed, as will be discussed in greater detail below. Notwithstanding, other differently configured embodiments are within the scope of this disclosure.

In the first embodiment, typically (e.g., preferably or optionally) none of the matte CSRL 18 is in direct contact with the substrate 12. More generally, typically substantially none of the matte CSRL 18 is in direct contact with the substrate 12. For example, typically at least the vast majority of the matte CSRL 18 is not direct contact with the substrate 12, since in some situations manufacturing tolerances, or other factors, may allow for a relatively small percentage of the matte CSRL 18 to come into direct contact with the substrate 12.

It is believed that the at least two CSRLs 16, 18 may work well together as described herein (e.g., fixedly cohering and/or adhering to one another) because, for example, the CSRLs 16, 18 may comprise, consist essentially of, or consist of similar chemical components, with the exception of the matte CSRL additionally containing matting agent(s). In general, the chemical composition of typical cold seal release lacquers is known by those of ordinary skill in the art to be based upon polyamides, polyamide/nitrocellouse blends, grafted polyamide blends, solvents, and additives such as waxes, rosin esters, and stabilizing compounds. It is believed that the polyamides, polyamide/nitrocellouse blends, grafted polyamide blends, solvents, and additives such as waxes, rosin esters, and stabilizing compounds may be the same, or substantially the same, for both the glossy CSRL 16 and the matte CSRL 18, with a difference between, or the difference between, the CSRLs 16, 18 being that the matte CSRL 18 further includes matting agent(s). In accordance with the first embodiment, if the glossy CSRL 16 includes any small amount of matting agent(s), then the matte CSRL 18 would typically include a significantly higher percentage of (e.g., many times more of) such matting agent(s). Stated differently, the CSRLs 16, 18 can consist of, or consist essentially of, the same materials, except that the matte CSRL 18 can include more matting agent(s) than the glossy CSRL 16. It is believed that suitable matting agents may include talc and other silica-based materials, although it is believed that any other suitable matting agents may be used.

For the purpose of providing a specific example, and not for the purpose of narrowing the scope of this disclosure, the cold seal adhesive 14 can be the cold seal adhesive designated by C1772B and available from Bostik Inc., the glossy CSRL 16 can be the coating referred to as "Candywrap Gloss Overprint Varnish" designated by FCRMIE88 and available from Siegwerk USA Co., and the matte CSRL 18 can be the coating referred to as "Extra Matte CSRL Overprint Varnish" designated by FCRM3B5YM and available from Siegwerk USA Co.

Figure 2:
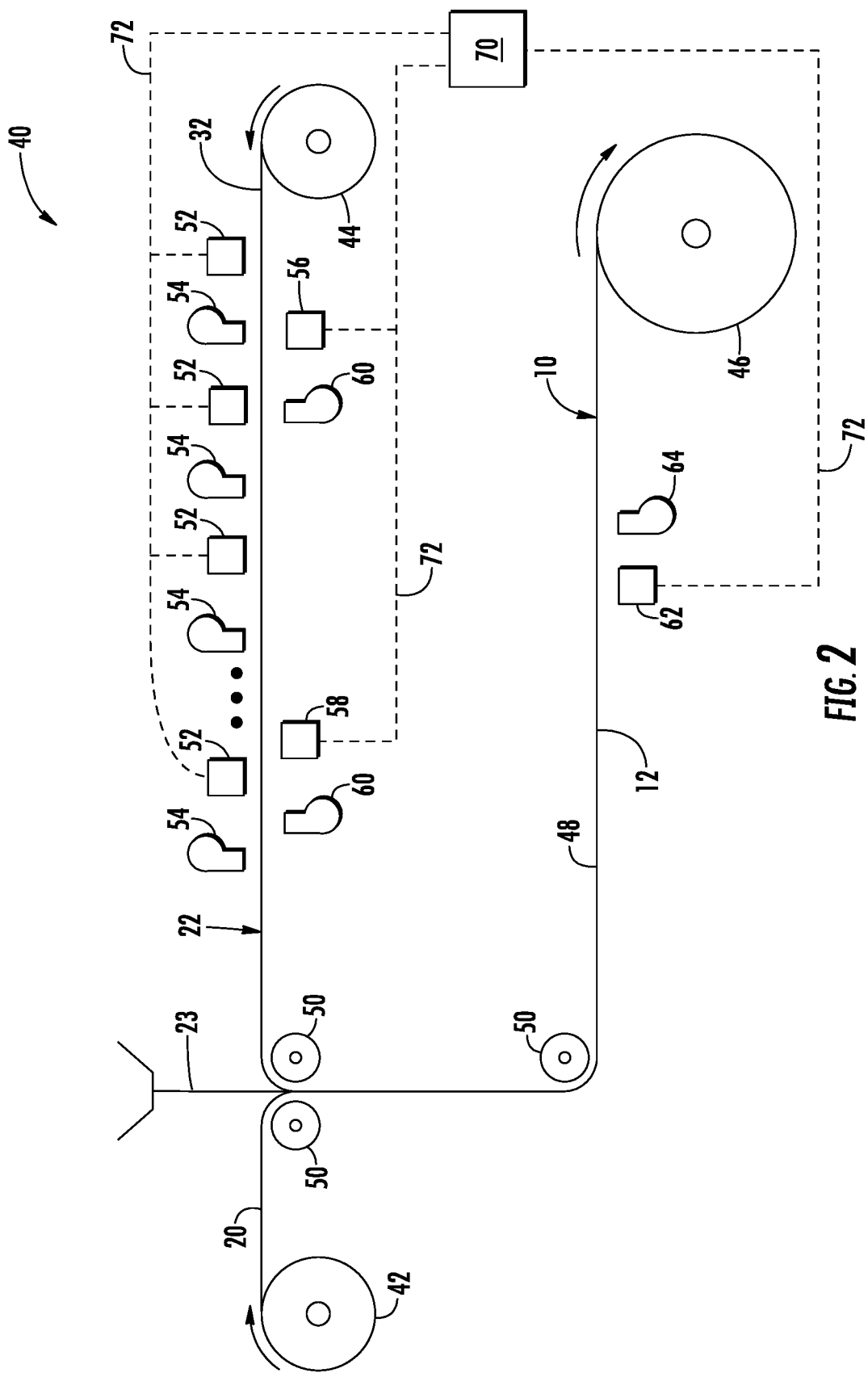
FIG. 2 is a schematic side view of an example of a system that can be used to form the packaging material of the first embodiment.

Referring to FIG. 2, an example of a system 40 that can used to manufacture the packaging material 10 is described in the following, in accordance with the first embodiment. The system 40 is depicted in FIG. 2 as being an "inline system" configured so that numerous features of the packaging material 10 are incorporated together in the single system 40. Alternatively and as will be discussed in greater detail below, one or more of the processes or operations that are described herein as being performed within the system 40 can be performed "out of line" by separate system(s).

Reiterating from above, the manufacturing of the packaging material 10 can include laminating at least the first and second webs 20, 22 to one another with the adhesive material 23. The laminating can be performed in any suitable manner. Upstream from the laminating, the first web 20 and the outer polymeric film web 32 can be respectively drawn from rolls 42, 44 and/or supplied in any other suitable manner. Downstream from the laminating, the web of packaging material 10 can be wound into a roll 46 and/or processed in any other suitable manner. The webs 20, 22 and a composite precursor web 48 can be respectively guided by rollers 50 and/or any other suitable features. For example, a pair of the rollers 50 can form a nip between which the webs 20, 22 and adhesive material 23 are received as part of the laminating. FIG. 2 may be schematic because, for example, the adhesive material 23 can be applied as at least one coating to the first web 20 and/or the second web 22 at a position upstream from the pair of rollers 50 that form the laminating nip. The at least one applicator for applying the adhesive material 23 can be a conventional gravure or flexographic adhesive application device.

In accordance with the version of the first embodiment depicted in FIG. 2, the CSRLs 16, 18 (FIG. 1) are applied to the second web 22 and/or the outer polymeric film web 32 by way of at least two respective applicators 56, 58. The applicators 56, 58 can be positioned adjacent, and together be arranged serially along, the length of the webs 22, 32. The applicator 56 can be configured to apply glossy CSRL 16 so that the glossy CSRL 16 is configured as described herein (e.g., as described above with reference to FIG. 1). Similarly, the applicator 58 can be configured to apply matte CSRL 18 so that the matte CSRL 18 is configured as described herein (e.g., as described above with reference to FIG. 1). Typically the glossy CSRL 16 applied by the applicator 56 is fully dried or at least substantially dried before the matte CSRL 18 is applied on the glossy CSRL. In this regard, the applicators 56, 58 can be proximate or otherwise associated with dryers 60 and/or other suitable curing devices that are arranged in an alternating series with the applicators 56, 58 along the length of the webs 22, 32.

Referring to FIGS. 1 and 2, a method of at least partially forming the packaging material 10 can include applying, in at least one coat (e.g., a flood coat), the glossy CSRL 16 on the substrate 12, and then applying, in at least one coat (e.g., a spot coat), the matte CSRL 18 directly onto at least a first predetermined surface area of the glossy CSRL. The matte CSRL 18 can form a first portion of an exterior surface of the packaging material 10. A second predetermined surface area of the glossy CSRL 16 can form a second portion of the exterior surface of the packaging material 10.

As schematically depicted in FIG. 2 for the first embodiment, except for the glossy CSRL 16 drying, the method of forming the packaging material 10 can omit any further processing of the glossy CSRL 16 between the process of applying the glossy CSRL 16 on the substrate 12 and the process of applying the matte CSRL 18 onto the first predetermined surface area of the glossy CSRL 16. As a more specific example of the first embodiment, the glossy CSRL 16 (e.g., the dry glossy CSRL 16) is not surface treated (e.g., is not deglossed) between the applying of the glossy CSRL 16 on the substrate 12 and the applying of the matte CSRL 18 directly onto the first predetermined surface area of the glossy CSRL 16. As another specific example of the first embodiment, the glossy CSRL 16 (e.g., the dry glossy CSRL 16) is not mechanically deglossed (e.g., by way of abrading) between the applying of the glossy CSRL 16 on the substrate 12 and the applying of the matte CSRL 18 directly onto the first predetermined surface area of the glossy CSRL 16. Similarly for the first embodiment, the glossy CSRL 16 (e.g., the dry glossy CSRL 16) is not chemically deglossed (e.g., by way of applying a solution comprising naphtha, ethyl acetate, ethyl alcohol, trisodium phosphate and/or any other suitable deglossing chemical agent) between the applying of the glossy CSRL 16 on the substrate 12 and the applying of the matte CSRL 18 directly onto the first predetermined surface area of the glossy CSRL 16.

For applying the inks 30 (FIG. 1), the system 40 can include a series of applicators 52 that are positioned adjacent, and together arranged along, the outer polymeric film web 32. The applicators 52 can be associated with dryers 54 and/or other suitable curing devices that are arranged in an alternating series with the applicators 52 and extend along the length of the outer polymeric film web 32. The inks 30 are typically applied by the applicators 52 in a conventional manner to at least partially form the interior side of the second web 22. The inks 30 are typically applied by the applicators 52, and dried by the dryers 54, to at least partially form artwork (e.g., define indicium, indicia, graphics, logos and/or any other suitable matter) that is included in packaging material 10. Any suitable number of applicators 52 and dryers 54 can be included. In the first embodiment, the ink 32 is applied by the applicators 52 to the outer polymeric film 32 by reverse printing. Reverse printing the artwork on outer polymeric film 32 allows a consumer to view the artwork defined by the ink 32 through the outer polymeric film 32 and the CSRLs 16, 18. Alternatively, the ink 32 may be omitted or applied to the opposite side of the outer polymeric film 32. For example, whether one or more of the inks 30 is omitted or not, one or more of the polymeric film 32 and the CSRLs 16, 18 can be opaque and/or include colorants (e.g., differently colored pigments). FIG. 2 may be schematic because, for example, all of the applicators 52, 56, 58 and heaters 54, 60 can be positioned on the same side of the flowpath along which the web 32 travels, wherein the web 32 is flipped accordingly to provide the packaging material 10 in the configuration schematically depicted in FIG. 1. In an example in which the applicators 52, 56, 58 are all positioned in series on the same side of the flowpath of the web 32, and the web is flipped (e.g., turned over) accordingly, all of the applicators 52 can be positioned between the applicators 56, 58. Accordingly, the applicator 56 can be the first applicator in the series of applicators 52, 56, 58, and the applicator 58 can be the last applicator in the series of applicators 52, 56, 58. A variety of differently arranged applicators are within the scope of this disclosure.

For applying the cold seal adhesive 14 (FIG. 1), the system 40 can include at least one applicator 62 that is positioned adjacent the second side of the substrate 12. The applicator 62 can be associated with at least one dryer 64. The cold seal adhesive 14 is typically applied by the applicator 62 in a conventional manner. After the cold seal adhesive 14 is dried (e.g., partially dried) by the heater 64, the cold seal adhesive 14 remains tacky. The packaging material 10, with its tacky cold seal adhesive 14, is typically formed into the roll 46 so that the cold seal adhesive 14 is in opposing face-to-face contact with, and releasably adhered to, both of the CSRLs 16, 18.

The applicators 52, 56, 58, 62 can be applicators suitable for applying the coatings respectively provided thereby. For example, the applicators 52, 56, 58, 62 can be gravure or flexographic printing stations configured for providing their respective coatings in a predetermined manner (e.g., predetermined patterns). In addition or alternatively, it is believed that the system 40 may also incorporate one or more inkjet printers and/or any other suitable types of printers. As another example, the applicator 62 can be a conventional gravure adhesive application device that is capable of applying the cold seal adhesive 14 in a predetermined pattern. For example, the dryers 54, 60, 64 can be conventional forced-convection heaters that burn natural gas.

With continued reference to FIGS. 1 and 2, and in accordance with the first embodiment, the interior polymeric film 26 (e.g., a portion of the first web 20) and the outer polymeric film 32 (e.g., a portion of the second web 22) can be extruded or cast polymer sheets that are self-supporting and windable. In contrast, the inks 30 and CSRLs 16, 18 are typically not self-supporting. For example, the inks 30 and CSRLs 16, 18 are typically applied at least indirectly to, and are typically at least indirectly supported by, the respective film 26, 32.

Respective components of the system 40 can be controlled in a predetermined manner by at least one computerized controller 70. For example, the controller 70 can communicate with respective components of the system 40 by way of respective communication paths 72. The communication paths 72 are schematically represented by dashed lines in FIG. 2. The communication paths 72 can include wired electrical communication paths and/or wireless (e.g., radio wave) communication paths.

In addition to communications between the controller 70 and one or more of the applicators 52, 56, 58, 62, the controller can communicate with any other suitable components that may be present in the system 40, for example motor controller(s), optical sensor(s) for sensing eye marks, and/or any other suitable features. The computerized controller 70 can include, or otherwise be associated with, one or more computer processors, computer software and/or computer memory devices cooperatively configured for causing the system 40 (e.g., features thereof) to operate in a predetermined manner to manufacture the packaging material 10.

At least partially reiterating from above, the system 40 is depicted in FIG. 2 as being an "inline system" configured so that each of the cold seal adhesive 14, CSRLs 16, 18 and one or more inks 30 are incorporated into the packaging material 10 within the system 40. Alternatively, one or more of the processes or operations that are described herein as being performed within the system 40 can be performed "out of line" by separate systems, for example so that one or more of the cold seal adhesive 14, CSRLs 16, 18 and inks 30 can be applied by system(s) that are separate from a system that joins the first and second webs 20, 22 to one another by way of laminating, or the like.

The system 40 can be configured so that there are a series of similarly operating applicators 52, 56, 58, 62 and heaters 54, 60, 64 spaced apart from one another in the direction crosswise to the machine direction ("crosswise direction"), so that the packaging material 10 can be cut into lengthwise strips that extend in the machine direction. Each of such strips of the packaging material 10 can be unwound from a roll and supplied to a conventional form-fill-seal machine (e.g., flow wrapping machine) that converts the strip into bags, overwraps, or the like. In the first embodiment, the unwinding of the packaging material 10 from the roll 46 and/or the unwinding of the strips of the packaging material 10 from their respective rolls can include the cold seal adhesive 14 releasing from both of the CSRLs 16, 18, without the matte CSRL 18 releasing from the glossy CSRL 16.

Figure 3:
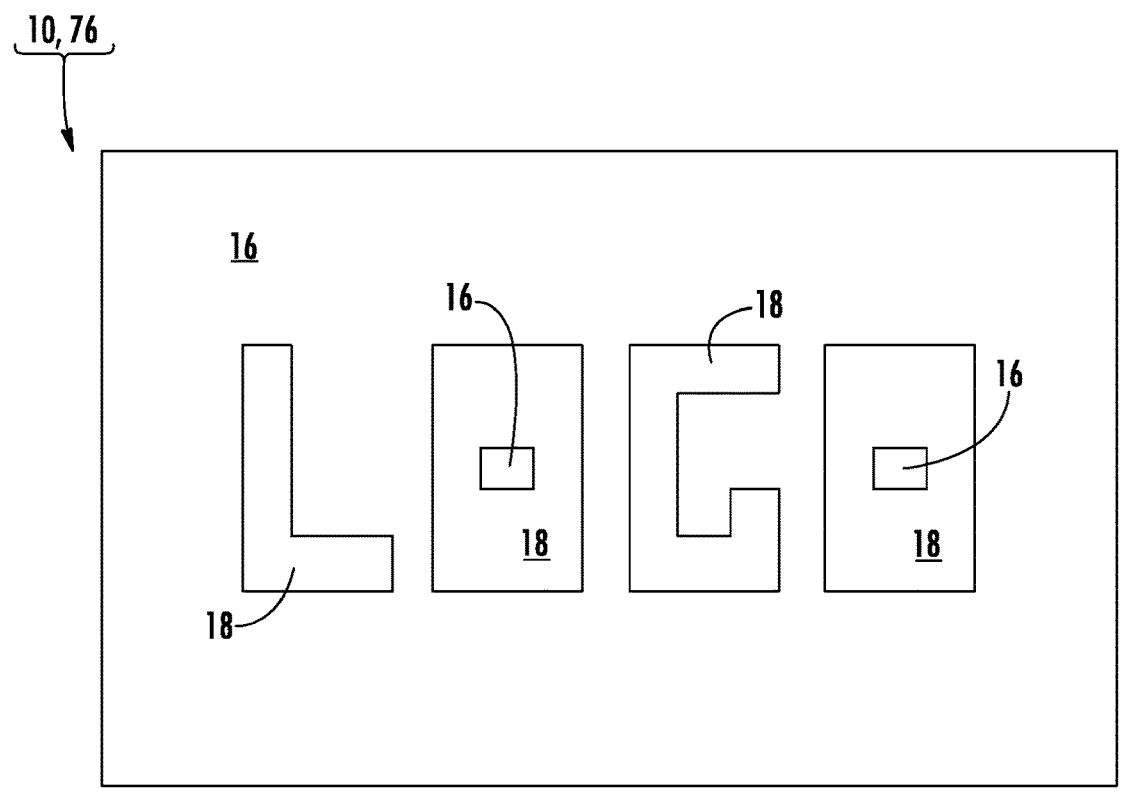
FIG. 3 is a schematic plan view of a wrapper portion of the packaging material of the first embodiment, wherein the wrapper is in an open, flat configuration.
Figure 4:
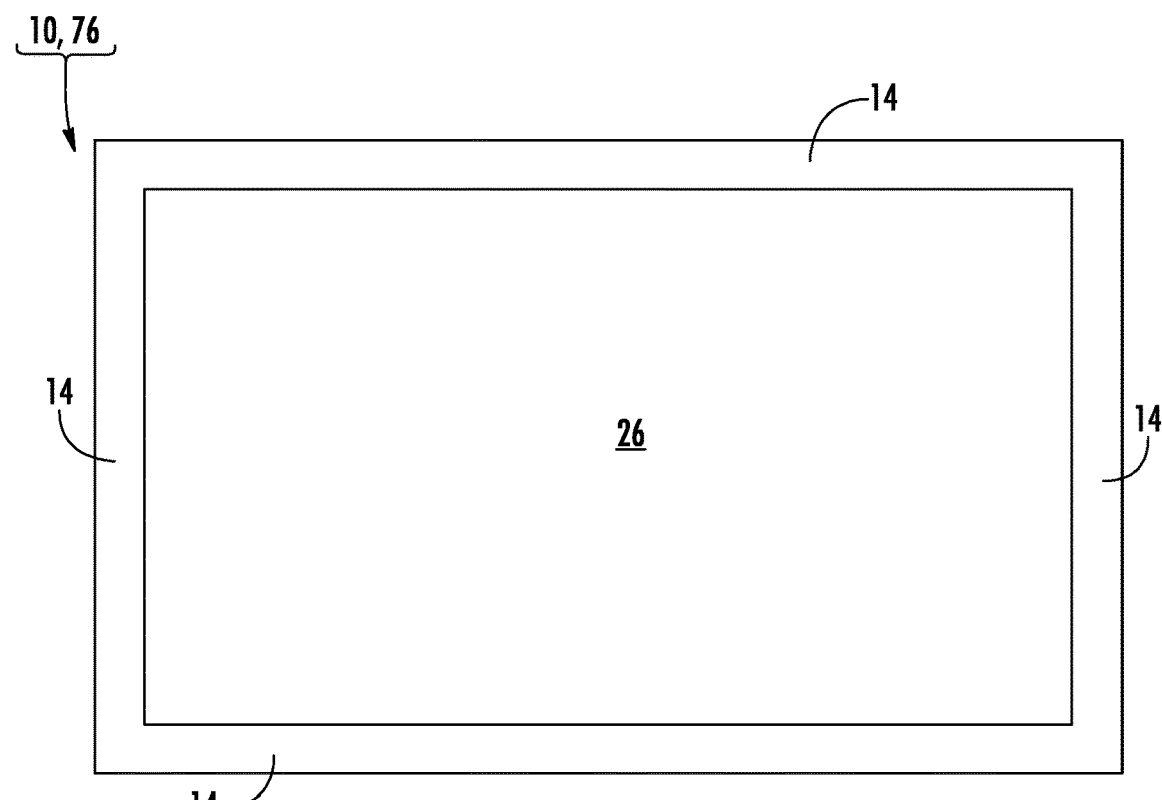
FIG. 4 is a schematic plan view of an interior side of the wrapper of FIG. 3.

As examples, FIGS. 3 and 4 schematically depict opposite sides of a single wrapper portion 76 of the packaging material 10. More specifically, FIG. 3 depicts the exterior side of the wrapper 76, and FIG. 4 depicts the interior side of the wrapper 76, in accordance with the first embodiment. The matte CSRL 18 can at least partially define indicium, indicia, graphics, logos and/or any other suitable artwork that is included in the packaging material 10. The indicium, indicia, graphics, logos, or the like, defined by the matte CSRL 18 can be superposed with the same indicia, graphics, logos, or the like, defined by a respective portion of the ink(s) 30. In the example depicted in FIG. 3, the matte CSRL 18 is configured to define indicium, such as a series of indicia in the form of a "LOGO" or in any other suitable configuration.

Figure 5:
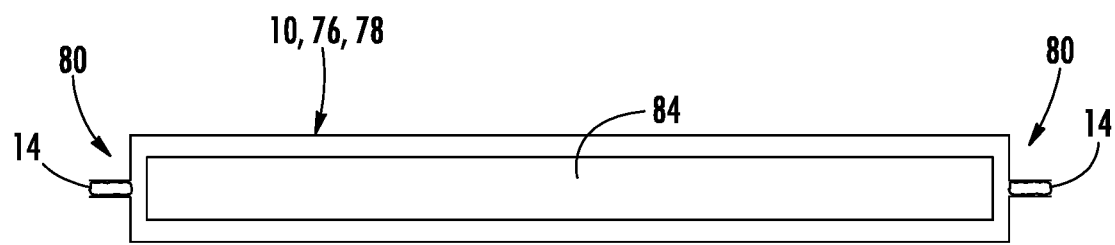
FIG. 5 is a schematic cross-sectional view of package formed from the wrapper of FIG. 3, in accordance with an embodiment of this disclosure.
Figure 6:
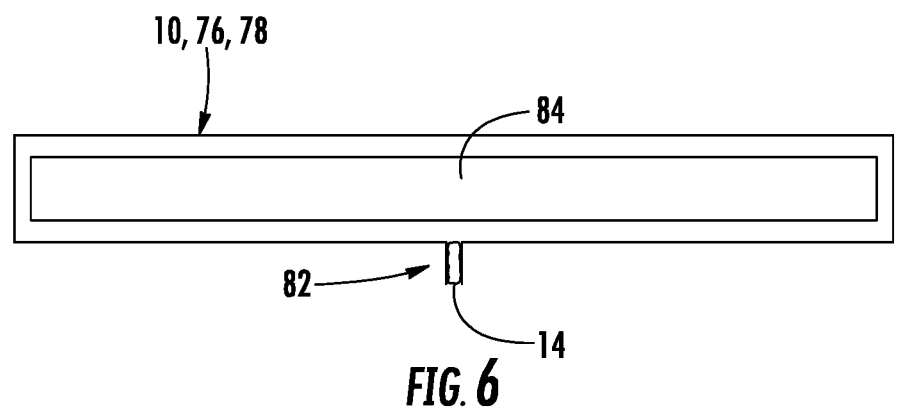
FIG. 6 is another schematic cross-sectional view of the package of FIG. 5.

Referring to FIG. 4, the cold seal adhesive 14 can cover the margins of the interior side of the wrapper 76, so that the wrapper can be folded over onto itself to form a package 78 (FIGS. 5 and 6). Referring to FIGS. 5 and 6, the respective strips of the cold seal adhesive 14 can be in opposing face-to-face contact with one another, and cohered to one another, to at least partially form end seals 80 and a fin seal 82 of the package 78. The fin seal 82 typically extends from one to the other of the end seals 80. Each package 78 can contain one or more articles 84, for example food products or any other suitable articles. Each package 78 can completely enclose its contents/articles 84 in a hermitically sealed manner. A wide variety of differently configured packaging materials, wrappers, packages, seals and articles are within the scope of this disclosure.

Other embodiments are within the scope of this disclosure. For example, a second embodiment can be like the first embodiment, except for variations noted and variations that will be apparent to those of ordinary skill in the art. In the second embodiment, the outer polymeric film 32 can be Amtopp TE25 BOPP available from Inteplast Group, the glossy CSRL 16 can be FCRM1E88 Gloss Cold Seal Release Lacquer available from Siegwerk USA Co., and the matte CSRL 18 can be FCRM9A2WQ Matte Cold Seal Release Lacquer available from Siegwerk USA Co. A first comparative example is like the second embodiment, except that the matte CSRL 18 is omitted. A second comparative example is like the second embodiment, except that the glossy CSRL 16 is omitted. The following Table 1 provides comparative test data including, for example, coefficient of friction ("COF") data:

TABLE 1

|  | Adhesion-#610 Scotch tape | Gloss-60° BYK Gloss Meter | Rub-Sutherland rub tester, 4# wt., ink to bond stock | COF-Static | COF-Kinetic |
| --- | --- | --- | --- | --- | --- |
| 1$^{st}$ Comparative Example | 100% | 75 | Pass @ 1000 cycles | 0.254 | 0.195 |
| 2$^{nd}$ Comparative Example | 100% | 20 | Pass @ 1000 cycles | 0.322 | 0.249 |
| 2$^{nd}$ Embodiment | 100% | 29 | Pass @ 1000 cycles | 0.245 | 0.211 |

As another example, a third embodiment can be like the second embodiment, except for variations noted and variations that will be apparent to those of ordinary skill in the art. In the third embodiment, the outer polymeric film 32 can be Amtopp TT25 BOPP available from Inteplast Group. A third comparative example is like the third embodiment, except that the matte CSRL 18 is omitted. A fourth comparative example is like the third embodiment, except that the glossy CSRL 16 is omitted. The following Table 2 provides comparative test data:

TABLE 2

|  | Adhesion-#610 Scotch tape | Gloss-60° BYK Gloss Meter | Rub-Sutherland rub tester, 4# wt., ink to bond stock | COF-Static | COF-Kinetic |
| --- | --- | --- | --- | --- | --- |
| 3$^{rd}$ Comparative Example | 100% | 76 | Pass @ 1000 cycles | 0.268 | 0.204 |
| 4$^{th}$ Comparative Example | 100% | 22 | Pass @ 1000 cycles | 0.351 | 0.247 |
| 3$^{rd}$ Embodiment | 100% | 30 | Pass @ 1000 cycles | 0.278 | 0.227 |

As another example, a fourth embodiment can be like the second embodiment, except for variations noted and variations that will be apparent to those of ordinary skill in the art. In the fourth embodiment, the outer polymeric film 32 can be F-CHC polyethylene terephthalate ("PET") available from Uflex Limited, wherein the glossy CSRL 16 is applied to a corona treated side of the outer polymeric film. A fifth comparative example is like the fourth embodiment, except that the matte CSRL 18 is omitted. A sixth comparative example is like the fourth embodiment, except that the glossy CSRL 16 is omitted. The following Table 3 provides comparative test data:

TABLE 3

|  | Adhesion-#610 Scotch tape | Gloss-60° BYK Gloss Meter | Rub-Sutherland rub tester, 4# wt., ink to bond stock | COF-Static | COF-Kinetic |
| --- | --- | --- | --- | --- | --- |
| 5th Comparative Example | 100% | 76 | Pass @ 1000 cycles | 0.252 | 0.201 |
| 6th Comparative Example | 100% | 21 | Pass @ 1000 cycles | 0.295 | 0.241 |
| 4th Embodiment | 100% | 30 | Pass @ 1000 cycles | 0.278 | 0.209 |

As another example, a fifth embodiment can be like the fourth embodiment, except for variations noted and variations that will be apparent to those of ordinary skill in the art. In the fifth embodiment, the glossy CSRL 16 is applied to a chemically treated side of the outer polymeric film. A seventh comparative example is like the fifth embodiment, except that the matte CSRL 18 is omitted. An eighth comparative example is like the fifth embodiment, except that the glossy CSRL 16 is omitted. The following Table 4 provides comparative test data:

TABLE 4

|  | Adhesion-#610 Scotch tape | Gloss-60° BYK Gloss Meter | Rub-Sutherland rub tester, 4# wt., ink to bond stock | COF-Static | COF-Kinetic |
| --- | --- | --- | --- | --- | --- |
| 7th Comparative Example | 100% | 73 | Pass @ 1000 cycles | 0.256 | 0.2 |
| 8th Comparative Example | 100% | 22 | Pass @ 1000 cycles | 0.332 | 0.245 |
| 5th Embodiment | 100% | 30 | Pass @ 1000 cycles | 0.255 | 0.208 |

As generally apparent from the above tables, the glossy CSRL 16 can have glossiness of about 73, about 75 or about 76; the matte CSRL 18 can have glossiness of about 20, about 21 or about 22; and the matte CSRL 18 on the glossy CSRL 16 can have glossiness of about 29 or about 30. As a more general example, the glossy CSRL 16 can have glossiness of from about 65 to about 80, from about 60 to about 85, or any values or subranges therebetween. The matte CSRL 18 can have glossiness of from about 18 to about 24, from about 15 to about 27, or any values or subranges therebetween. The matte CSRL 18 on the glossy CSRL 16 can have glossiness from about 27 to about 33, from about 24 to about 36, or any values or subranges therebetween.

The packaging material 10 can include one or more different, additional, or less layers of material. For example, the outer polymeric film 32 can be a transparent polyester film designated by F-CHC and available from Uflex Limited.

It is believed that those of ordinary skill in the art will readily understand cold seal release lacquers. Notwithstanding, examples of blocking and bond evaluation for cold seal structures are discussed in the following. For example, for determining whether a cold seal release coating is functioning properly, coated samples comprising the cold seal release coating can be submitted to a blocking test to closely simulate actual conditions to which the associated cold seal adhesives may be exposed during conversion and/or transport. A variety of tests are available to determine the blocking resistance of a cold seal adhesive to the cold seal release coating of a release coated substrate. For example, ASTM D918 Standard Test for Blocking Resistance of Paper and Paperboard can be used, as this test is understood by those skilled in the art to characterize blocking resistance. It is also possible, for example, to use a test similar to ASTM D918, but with altered testing conditions (e.g., altered environmental temperatures and humidity, increased pressures applied to the samples, shorter dwell times, etc.) to more closely simulate actual conditions to which the cold seal adhesives may be exposed during conversion and/or transport. For example, rather than operating at 140 degrees Fahrenheit and applying a pressure of 1 psi to test specimens for 24 hours, lower temperatures (e.g., room temperature), higher pressures, and/or shorter dwell times may be employed.

Following is a discussion of an example of a method of testing the blocking resistance of a cold seal adhesive to a cold seal release coating using specialized equipment, such as a Kohler Block Tester. Such a blocking test can be conducted on test specimens or test samples in a manner resembling that set forth in ASTM D918, and such a blocking test is understood by those skilled in the art to characterize the blocking resistance of cold seal adhesive to a cold seal release coating. The blocking test can also be a useful way to determine if the cold seal release coatings may transfer any substances to the cold seal adhesive that might change (e.g., degrade) the bond performance of the cold seal adhesive during conversion and/or transport. In an example of such block testing, the following structures were cut into 1 inch wide strips and evaluated for blocking resistance, and subjected to a post-blocking cold seal adhesive deadening test after being subjected to 16 hours at 122 deg. F. at 100 psi in a Kohler Block Tester and allowed to equilibrate for 1 hour.

Structure #1: Matte CSRL (i.e., cold seal release coating)/ 48 gauge F-CHC/Adhesive/70 gauge AlOx Coated BOPP/Cold Seal Adhesive Structure #2: Gloss CSRL (i.e., cold seal release coating)/ 48 gauge F-CHC/Adhesive/70 gaugeOx Coated BOPP/ Cold Seal Adhesive Structure #3: Matte CSRL (i.e., cold seal release coating)/ 100 gauge TE25/Adhesive/70 gauge AlOx Coated BOPP/Cold Seal Adhesive Structure #4: Gloss CSRL (i.e., cold seal release coating)/ 100 gauge TE25/Adhesive/70 gauge AlOx Coated BOPP/Cold Seal Adhesive After the samples were equilibrated the release properties were tested by measuring the peel strength ("cling") value of the cold seal adhesive to the cold seal release coatings by using an Instron peel testing at the rate of 12 inches/min. To measure the peel strength (bond) value of the cold seal adhesive samples were sealed using 80 psi/0.5 second dwell/ serrated jaws then tested immediately using an Instron peel tester peeling at the rate of 12 inches/minute. The test results are presented in the following Table 5:

TABLE 5

| | Storage Conditions (122° F./100 PSI/16 Hours) | |
|---|---|---|
| | Clings (g/in) | Bonds (g/in) |
| Structure # 1 | 4 | 506 |
| Structure # 2 | 7 | 502 |
| Structure # 3 | 5 | 530 |
| Structure # 4 | 6 | 450 |

In evaluating acceptable results of the above-discussed blocking test, the following example of guidelines can be used, which are understood by those skilled in the art to characterize cold seal release coating and cold seal bond performance:

Peak Peel Strength Bonds (e.g., "Bonds" in above table): > or =to 300 grams/inch Release Value after aging at 122 deg. F. (e.g., "Clings" in above table): <100 grams/inch It is believed that the guidelines provided above may vary in different situations, for example by plus or minus ten percent, plus or minus twenty percent or plus or minus thirty percent, including values and ranges therebetween.

In accordance with the first embodiment, it is believed that the peel strength ("cling") value of the cold seal adhesive to 14 to the matte CSRL 18 on the glossy CSRL 16 using an Instron peel testing at the rate of 12 inches/min may be less than 100 grams/inch, less than 80 grams/inch, less than 60 grams/inch, less than 40 grams/inch, less than 20 grams/inch, or less than 10 grams/inch. As other examples, it is believed that the peel strength ("cling") value of the cold seal adhesive to 14 to the matte CSRL 18 on the glossy CSRL 16 using an Instron peel testing at the rate of 12 inches/min may be in a range of from about 2 grams/inch to about 20 grams/inch, or in a range of from about 3 grams/inch to about 10 grams/inch, or any values or subranges therebetween.

Those of ordinary skill in the art will understand that cold seal adhesives typically are compositions based on natural and/or synthetic rubber optionally used in combination with modified resins and waxes. In addition to rubbers, polymers based on styrene, (meth)acrylic acid or vinyl ether are widely used alone or as a mixture. Compositions including mixtures of natural and synthetic rubbers and copolymers of (meth)acrylic acid and styrene may optionally be preferred.

Other embodiments are within the scope of this disclosure. For example, a sixth embodiment can be like the first embodiment, except for variations noted and variations that will be apparent to those of ordinary skill in the art. In the sixth embodiment, the positions of the CSRLs 16, 18 are interchanged with one another, so that the matte CSRL 18 (which comprises a spot coat) is positioned between the glossy CSRL 16 (which comprises a flood coat) and the substrate 12.

As another example, a seventh embodiment can be like the first embodiment, except for variations noted and variations that will be apparent to those of ordinary skill in the art. In the seventh embodiment, the positions and configurations of the CSRLs 16, 18 are interchanged with one another, so that the matte CSRL 18 covers all of, or at least the vast majority of (e.g., can comprise a flood coat covering substantially all of) the second side or surface of the substrate 12, and the glossy CSRL 16 is configured as a pattern (e.g., at least one spot coating) in opposing, face-to-face, direct contact with the matte CSRL 18. In the seventh embodiment, the glossy CSRL 16 can be applied over the matte CSRL 18, so that the matte CSRL 18 (which comprises a flood coat) is positioned between the glossy CSRL 16 (which comprises a spot coat) and the substrate 12.

It is believed that U.S. Pat. Nos. 5,466,734 and 5,981,047, and U.S. Pat. Appl. Pub. No. 2016/0319074 disclose cold seal release lacquers. To supplement the present disclosure, this application incorporates by reference the following documents for their disclosures of cold seal release lacquers: U.S. Pat. Nos. 5,466,734 and 5,981,047, and U.S. Pat. Appl. Pub. No. 2016/0319074.

In the above description and/or figure, examples of embodiments have been disclosed. The present invention is not limited to such exemplary embodiments. Unless otherwise noted, specific terms have been used in a generic and descriptive sense and not for purposes of limitation. The use of the term "and/or" includes any and all combinations of one or more of the associated listed items.

What is claimed is:

1. A packaging material, comprising:
   a substrate having opposite first and second sides;
   cold seal adhesive on the second side of the substrate;
   glossy cold seal release lacquer on the first side of the substrate; and
   matte cold seal release lacquer fixedly connected to at least a predetermined surface area of the glossy cold seal release lacquer,
   wherein the glossy cold seal release lacquer has a shinier visual appearance than the matte cold seal release lacquer, and
   wherein the packaging material is formed into a roll in which:
      the cold seal adhesive is releasably adhered to both the glossy cold seal release lacquer and the matte cold seal release lacquer;
      the glossy cold seal release lacquer is fixedly adhered to the substrate; and
      the matte cold seal release lacquer is fixedly attached to the glossy cold seal release lacquer.

2. The packaging material according to claim 1, wherein the matte cold seal release lacquer covers the predetermined surface area of the glossy cold seal release lacquer, so that the predetermined surface area of the glossy cold seal release lacquer is positioned between the matte cold seal release lacquer and the first side of the substrate.

3. The packaging material according to claim 2, wherein:
   the predetermined surface area of the glossy cold seal release lacquer is a first predetermined surface area of the glossy cold seal release lacquer; and
   a second predetermined surface area of the glossy cold seal release lacquer is not covered by the matte cold seal release lacquer.

4. The packaging material according to claim 3, wherein:
the matte cold seal release lacquer forms a first portion of an exterior surface of the packaging material, and
the second predetermined surface area of the glossy cold seal release lacquer forms a second portion of the exterior surface of the packaging material.

5. The packaging material according to claim 1, wherein the matte cold seal release lacquer is in opposing, face-to-face, direct contact with the glossy cold seal release lacquer.

6. The packaging material according to claim 1, wherein:
the substrate comprises ink on a polymeric film, and
the polymeric film defines the first side of the substrate.

7. The packaging material according to claim 1, wherein at least one of the matte cold seal release lacquer and the glossy cold seal release lacquer comprises:
at least one of a polyamide, polyamide/nitrocellouse blend, and grafted polyamide blend,
a solvent, and
at least one of a wax, rosin ester, and a stabilizing compound.

8. The packaging material according to claim 1, wherein the matte cold seal release lacquer and the glossy cold seal release lacquer each comprise substantially the same material, except that the matte cold seal release lacquer includes more matting agent than the glossy cold seal release lacquer.

9. A packaging material, comprising:
a substrate having opposite first and second sides, wherein the substrate comprises ink on a polymeric film, the polymeric film forms the first side of the substrate, and the polymeric film is transparent, translucent or any combination thereof;
cold seal adhesive on the second side of the substrate;
glossy cold seal release lacquer on the first side of the substrate, wherein the glossy cold seal release lacquer is transparent, translucent or any combination thereof; and
matte cold seal release lacquer in opposing, face-to-face, direct contact with, and fixedly connected to, a first predetermined surface area of the glossy cold seal release lacquer, so that:
the matte cold seal release lacquer covers the first predetermined surface area of the glossy cold seal release lacquer,
the first predetermined surface area of the glossy cold seal release lacquer is positioned between the matte cold seal release lacquer and the first side of the substrate,
the matte cold seal release lacquer forms a first portion of an exterior surface of the packaging material,
a second predetermined surface area of the glossy cold seal release lacquer is not covered by the matte cold seal release lacquer,
the second predetermined surface area of the glossy cold seal release lacquer forms a second portion of the exterior surface of the packaging material, and
the first and second portions of the exterior surface of the packaging material are contiguous with one another;
wherein the packaging material is formed into a roll in which:
the cold seal adhesive is releasably adhered to both the glossy cold seal release lacquer and the matte cold seal release lacquer;
the glossy cold seal release lacquer is fixedly adhered to the substrate; and
the matte cold seal release lacquer is fixedly attached to the glossy cold seal release lacquer.

10. The packaging material according to claim 9, wherein the matte cold seal release lacquer is transparent, translucent or any combination thereof.

11. The packaging material according to claim 9, wherein the glossy cold seal release lacquer is optically transparent.

12. The packaging material according to claim 9, wherein the glossy cold seal release lacquer is more optically transparent than the matte cold seal release lacquer.

13. The packaging material according to claim 9, wherein the matte cold seal release lacquer reflects light more diffusely than the glossy cold seal release lacquer.

14. The packaging material according to claim 9, wherein the glossy cold seal release lacquer has glossiness of from about 60 to about 85.

15. The packaging material according to claim 9, wherein the matte cold seal release lacquer has a glossiness of from about 15 to about 27.

16. The packaging material according to claim 9, wherein:
the matte cold seal release lacquer is on the glossy cold seal release lacquer; and
the matte cold seal release lacquer on the glossy cold seal release lacquer has a glossiness from about 24 to about 36.

17. The packaging material according to claim 9, wherein at least one of the matte cold seal release lacquer and the glossy cold seal release lacquer comprises:
at least one of a polyamide, polyamide/nitrocellouse blend, and grafted polyamide blend,
a solvent, and
at least one of a wax, rosin ester, and a stabilizing compound.

18. The packaging material according to claim 9, wherein the matte cold seal release lacquer and the glossy cold seal release lacquer each comprise substantially the same material, except that the matte cold seal release lacquer includes more matting agent than the glossy cold seal release lacquer.

19. The packaging material according to claim 9, wherein the matte cold seal release lacquer is cohered to the glossy cold seal release lacquer.

20. A method of at least partially forming packaging material, the method comprising:
applying, in at least one coat, glossy cold seal release lacquer, so that the applied glossy cold seal release lacquer is on a first side of a substrate; and
applying, in at least one coat, matte cold seal release lacquer directly onto at least a first predetermined surface area of the applied glossy cold seal release lacquer, wherein:
the applied matte cold seal release lacquer forms a first portion of an exterior surface of the packaging material, and
a second predetermined surface area of the glossy cold seal release lacquer forms a second portion of the exterior surface of the packaging material, and
the glossy cold seal release lacquer having a shinier visual appearance than the matte cold seal release lacquer;
applying, in at least one coat, a pattern of cold seal adhesive on a second side of the substrate; and
forming the packaging material into a roll so that the cold seal adhesive is in opposing, face-to-face contact with at least one of the glossy cold seal release lacquer and the matte cold seal release lacquer.

21. The method according to claim 20, wherein the first predetermined surface area of the applied glossy cold seal release lacquer is not deglossed prior to the applying of the matte cold seal release lacquer.

22. The method according to claim 20, wherein the first and second portions of the exterior surface of the packaging material are adjacent one another.

23. The method according to claim 20, wherein the applying of the glossy cold seal release lacquer is comprised of flood coating the glossy cold seal release lacquer on the first side of the substrate.

24. The method according to claim 20, wherein the applying of the matte cold seal release lacquer is comprised of spot coating the matte cold seal release lacquer directly onto the glossy cold seal release lacquer.

25. The method according to claim 20, further comprising unrolling the packaging material, comprising the cold seal adhesive releasing from both the glossy cold seal release lacquer and the matte cold seal release lacquer, without the matte cold seal release lacquer releasing from the glossy cold seal release lacquer.

26. The method according to claim 20, wherein the glossy cold seal release lacquer is transparent, translucent or any combination thereof.

27. The method according to claim 20, wherein:

the substrate comprises ink on a polymeric film, and the polymeric film defines the first side of the substrate.

28. The method according to claim 20, wherein at least one of the matte cold seal release lacquer and the glossy cold seal release lacquer comprises:

at least one of a polyamide, polyamide/nitrocellouse blend, and grafted polyamide blend, a solvent, and at least one of a wax, rosin ester, and a stabilizing compound.

29. The method according to claim 20, wherein the matte cold seal release lacquer and the glossy cold seal release lacquer each comprise substantially the same material, except that the matte cold seal release lacquer includes more matting agent than the glossy cold seal release lacquer.

* * * * *